Sept. 24, 1935.  M. E. BENESH  2,015,249
APPARATUS FOR MEASURING THE FLOW OF A FLUID
Filed May 24, 1933   2 Sheets-Sheet 1
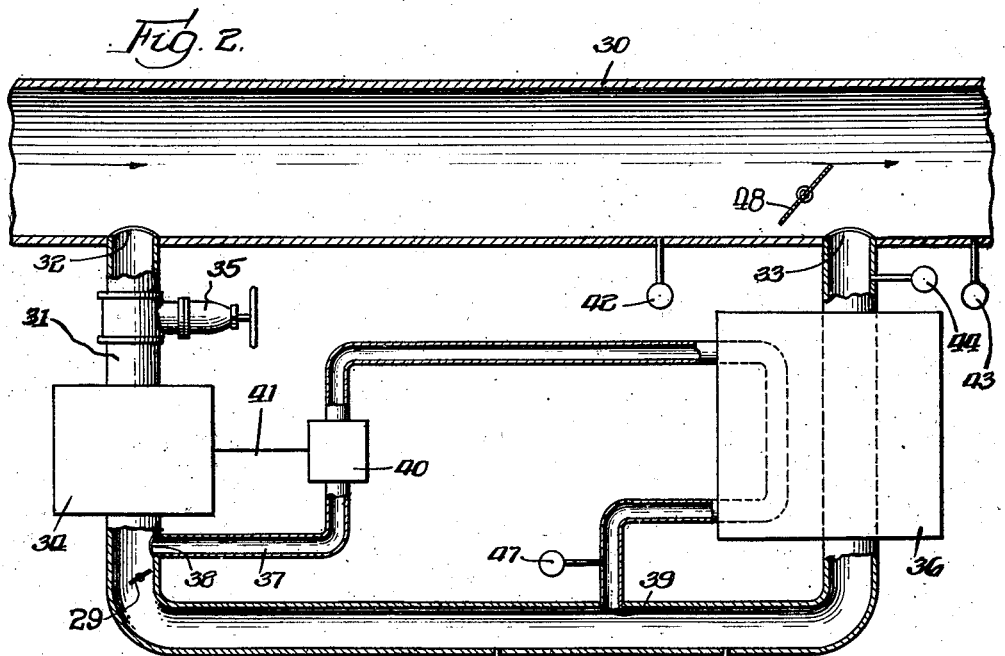

Sept. 24, 1935. M. E. BENESH 2,015,249
APPARATUS FOR MEASURING THE FLOW OF A FLUID
Filed May 24, 1933 2 Sheets-Sheet 2
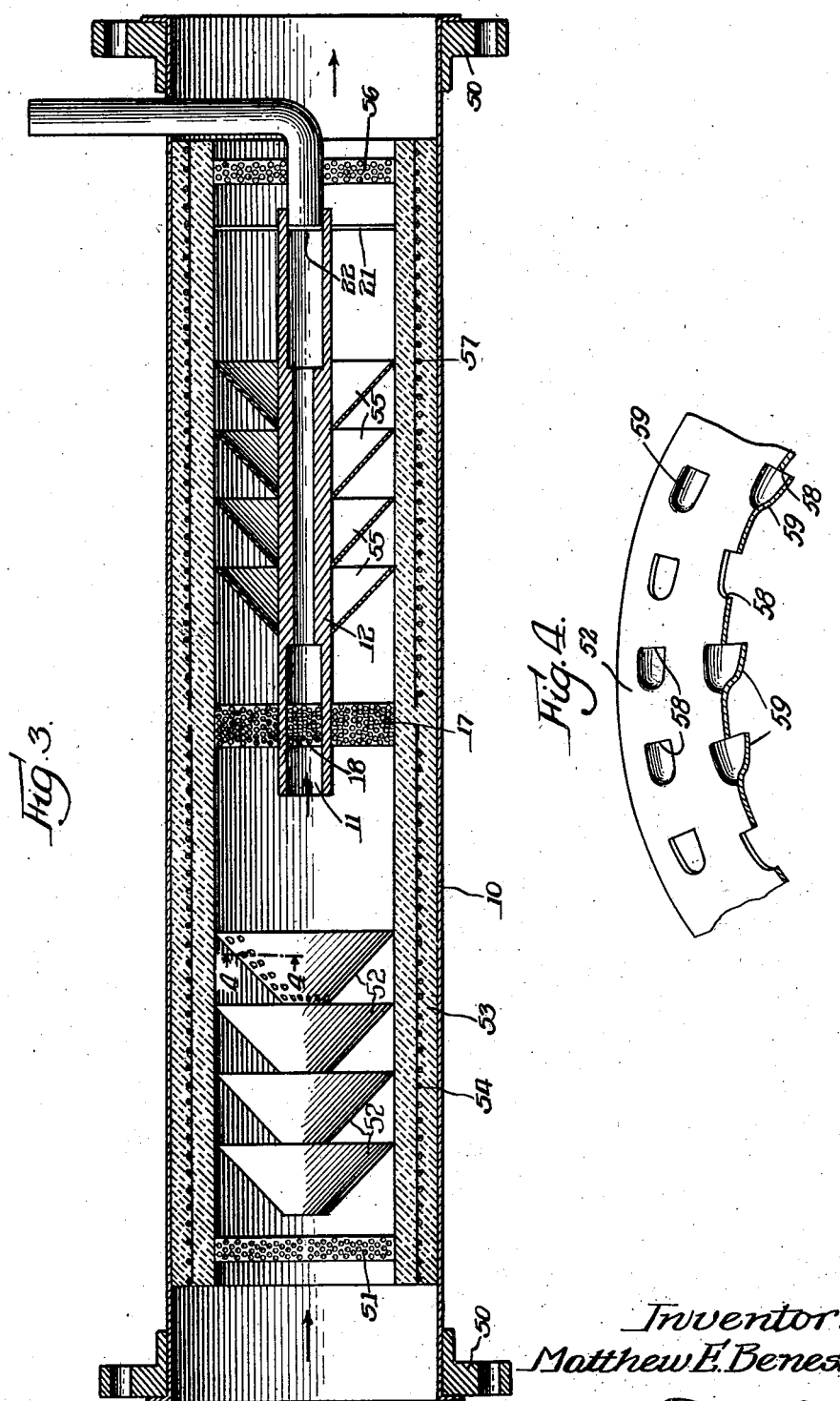
Inventor:
Matthew E. Benesh Patented Sept. 24, 1935

2,015,249

UNITED STATES PATENT OFFICE 2,015,249

APPARATUS FOR MEASURING THE FLOW OF A FLUID

Matthew E. Benesh, Cicero, Ill.; dedicated to the People of the United States of America Application May 24, 1933, Serial No. 672,638

13 Claims. (Cl. 73—68)

The invention relates generally to an apparatus for measuring the flow of fluids and particularly the flow of gases.

The general object of the invention is to provide a fundamental device for measuring the flow of a fluid, which is of high precision, and has component parts the accuracy of which is readily provable.

Another object is to provide an apparatus of this type by which the variations in the physical properties of the fluid to be measured are accurately compensated for by balancing.

A further object is to provide an apparatus of this type which measures a part of the fluid having a predetermined relation to the whole.

Other objects and advantages will become apparent from the following description taken in connection with the accompanying drawings, in which:

Figure 1 is a diagrammatic view of an apparatus embodying the features of the invention.

Fig. 2 is a diagrammatic view of a modified form of the device.

Fig. 3 is a fragmentary sectional view of the device shown diagrammatically in Fig. 1.

Fig. 4 is an enlarged sections taken on the line 4—4 of Fig. 3.

The invention comprises in general a conduit for the fluid to be measured and means for withdrawing a part of said fluid. A heat change is then effected in the main mass of fluid and said part in a predetermined ratio, and the physical properties of the main mass and said part are all balanced, so that the flow of the main mass may be readily determined by the flow of said part. The term "fluid" as employed herein is used in a broad sense to include either a gas or liquid.

In the preferred embodiment of the apparatus diagrammatically shown in Fig. 1, the fluid to be measured flows in the direction of the arrows through a main conduit 10. In measuring the flow, a part of the main mass of the fluid is withdrawn at 11 by means of an auxiliary conduit 12, and is returned to the main conduit at 13. The part of the fluid in the auxiliary conduit 12 at the time it is withdrawn has the same physical properties, such as temperature, pressure and specific heat, as the main mass, regardless of variations in these properties of the main mass.

To measure the main flow, I provide means for effecting a thermal change both in the main mass of fluid and in the part flowing through the auxiliary conduit 12, the change in one having a predetermined relation to the change in the other. Preferably, the thermal change consists of an addition of heat to the main mass and to the part, the respective quantities of heat added having the predetermined ratio. To this end, a closed circuit for a heat conveying medium such as a liquid is provided, which comprises a pump 14 and a heat exchanger 15 by which heat may be imparted to the liquid.

The heat conveying circuit is divided into two parallel portions, one extending to the auxiliary conduit 12 and the other to the main conduit 10, and the flow of liquid to the respective portions is controlled by a proportioning device 16 so that ratio between the flows in the respective portions is known. Thus, heat is conveyed to the main mass of fluid and the part flowing in the auxiliary conduit in a predetermined ratio.

Interposed in one branch of the heat conveying circuit and located within the main conduit 10 is a heat exchanger, here shown in the form of a coil 17, by which the heat in the liquid is transferred to the main mass of fluid. A similar coil 18 in the other branch of the heat conveying circuit is placed in the auxiliary conduit 12. The returns from the coils 17 and 18 are both connected to the pump 14, and are provided with thermometers 19 and 20 whereby the relative temperatures of the liquid in the respective returns may be determined. Thermometers 21 and 22 are also provided in the main and auxiliary conduits 10 and 12 by which the respective temperatures of the fluids therein, after being heated by the coils 17 and 18, may be determined. The incoming temperature of the main mass of fluid may be indicated by a thermometer 27.

Means for measuring the flow of fluid is interposed in the auxiliary conduit 12 and preferably comprises a positive-displacement meter 23 of the piston type. A valve 24 is also provided for regulating the flow through the auxiliary conduit 12.

To produce the flow through the auxiliary conduit 12, a pressure difference in the main conduit 10 between the points 11 and 13 is established as by an adjustable dam 26 in the main conduit between the thermometer 21 and point 13, which offers a resistance to the flow in excess of the balanced resistances offered by the heat exchangers, mixers, thermometers, and energy change balancers in both conduits 10 and 12.

In determining the flow of the fluid by means of this apparatus, the heat added to the main mass of fluid may be expressed, as follows:

Heat added $= M_{21} \times SH_{27-21} \times T_{21-27}$ where $M_{21}$ = the main mass of fluid flowing over thermometer 21, per unit time, i.e. through the main conduit 10 between the points 11 and 13.

$SH_{27-21}$ = the mean specific heat of the main mass between the temperatures indicated by the thermometers 27 and 21 and $T_{21-27}$ = the rise in temperature in the main mass as indicated by the thermometers 27 and 21.

The heat added to the main mass is obviously equal to the heat lost by the heating liquid in the coil 17, the heat lost being expressible as follows:

Heat lost $= M_{17} \times SH_{16-19} \times T_{16-19}$ where $M_{17}$ = the mass of the heating liquid passing through the coil 17 per unit time.

$SH_{16-19}$ = the specific heat of the heating liquid between the temperature of the liquid leaving the proportioning device 16 and the temperature indicated by the thermometer 19 and $T_{16-19}$ = the temperature drop in the heating liquid as indicated by the temperature of the liquid leaving the proportioning device 16 and the temperature indicated by the thermometer 19.

Equating these expressions for heat added and heat lost, (1) $M_{21} \times SH_{27-21} \times T_{21-27} = M_{17} \times SH_{16-19} \times T_{16-19}$ A similar equation may be set up for the conditions existing in the auxiliary conduit. Thus, (2) $M_{23} \times SH_{27-22} \times T_{22-27} = M_{18} \times SH_{16-20} \times T_{16-20}$ where $M_{23}$ = the mass flowing through the auxiliary conduit 12, per unit time, determinable by meter 23.

$SH_{27-22}$ = the mean specific heat of the fluid in the auxiliary conduit between the temperatures indicated by the thermometers 22 and 27

$T_{22-27}$ = the temperature rise of the fluid in the auxiliary conduit as indicated by the thermometers 22 and 27

$M_{18}$ = the mass of the heating liquid passing through the coil 18 per unit time $SH_{16-20}$ = as above, the specific heat of the heating liquid between the temperature of the liquid leaving the proportioning device 16 and the temperature indicated by the thermometer 20

$T_{16-20}$ = the temperature drop in the heating liquid as indicated by the thermometer 20 and the temperature of the liquid leaving the proportioning device 16.

Dividing Equation (1) by Equation (2), the following equation is obtained:

(3) $\dfrac{M_{21} \times SH_{27-21} \times T_{21-27}}{M_{23} \times SH_{27-22} \times T_{22-27}} = \dfrac{M_{17} \times SH_{16-19} \times T_{16-19}}{M_{18} \times SH_{16-20} \times T_{16-20}}$ The valve 24 controls the flow of fluid through the auxiliary conduit 12, and if the various parts are properly designed this flow may be adjusted so that the temperatures of the main mass and auxiliary mass, as indicated by the thermometers 21 and 22, are equalized. Such equalization also equalizes the temperatures of the returning portions of the heating liquid, as indicated by thermometers 19 and 20, when the coils 17 and 18 are constructed with sufficient surface to bring the fluids in the conduits up to substantially the same temperature as that of the heating liquid when it leaves the conduits, i. e. the temperatures indicated by thermometers 19 and 20. When these temperatures as indicated by thermometers 19, 20, 21, and 22 are equalized, the following conditions exist:

$T_{21-27} = T_{22-27}$ and $T_{16-19} = T_{16-20}$.

And, since the fluids in the main conduit 10 and in the auxiliary conduit 12 are the same and undergo the same temperature change, $SH_{27-21} = SH_{27-22}$ Also the heating fluids in coils 17 and 18 are the same and undergo the same temperature change, therefore $SH_{16-19} = SH_{16-20}$ Substituting the various equalities in Equation (3) and simplifying, it becomes $\dfrac{M_{21}}{M_{23}} = \dfrac{M_{17}}{M_{18}}$ or $M_{21} = M_{23} \times \dfrac{M_{17}}{M_{18}}$ The total flow of fluid $M_{27}$ passing thermometer 27 is obviously equal to the sum of $M_{21}$ and $M_{23}$.

Therefore, $M_{21} = M_{27} - M_{23}$

Substituting this value of $M_{21}$ in the above equation and simplifying we get, $M_{27} = \left(\dfrac{M_{17}}{M_{18}} + 1\right) M_{23}$ The ratio $\dfrac{M_{17}}{M_{18}}$ is the ratio of the masses of the two portions of the heating liquid flowing per unit time as determined by the proportioning device 16. Hence, the ratio is a constant for any setting of the proportioning device and likewise 1 plus this constant ratio is a constant and is predetermined. Also, $M_{23}$ may be determined by the meter 23, so that the volume of the mass flowing by thermometer 27 in the main conduit 10 may be obtained by multiplying the reading of the meter 23 by a constant determined by the setting of the proportioning device 16.

Also, from Equation (4), it will be noted that, if the auxiliary mass $M_{23}$ is held constant, the total mass may be determined by the ratio of the proportioning device 16. Hence, with a constant rate of flow through the auxiliary conduit the proportioning device 16 may be varied to equalize the temperatures 21 and 22.

These considerations are based on the premise that the heat and all other energy transfers in the main and auxiliary conduits other than those stated are either negligible quantities whose magnitude can be determined or occur in such a manner that they are counter-balanced and so do not affect the result.

The determination of the total flow may be converted into terms which apply when the fluid is at a predetermined constant temperature and absolute pressure, if desired. These terms may be in volume or mass units, or by determining the heat of combustion developed by a definite and known portion of the total flow, the total flow may be expressed in terms of heat units as well as volume or mass units.

In the above considerations, the coils 17 and 18 are of such size that the temperatures of the heating liquid fall to substantially the same point as the temperatures of the heated fluid. However, the coils 17 and 18 may be shortened so that the temperatures of the heating fluid do not fall to the temperatures to which the fluid in the main and auxiliary conduits rises. Where the coils are so shortened, the valve 24 controls the flow in the auxilary conduit 12 to equalize the temperatures of the main and auxiliary masses as indicated by the thermometers 21 and 22.

The temperatures of the returning portions of the heating liquid as indicated by the thermometers 19 and 20 may not be equal, unless suitable provision is made, because of unproportional heat transfer by the coils 17 and 18, even though the temperatures of the main and auxiliary masses of fluid are equalized.

From Equation (3), it will be noted that the temperature drops in the respective portions of the heating liquid are preferably equalized so that their effects upon the determination of the main mass may be balanced. To this end, a by-pass 25 controlled by a valve 26 is placed across the coil 17, so that the temperature indicated at 19 may be controlled and equalized with the temperature indicated at 20.

It will be noted that the accuracy of this apparatus depends upon the accuracy of the meter 23, the accuracy of the proportioning device 16, the accuracy of the various thermometers, and the design being such that potential, velocity, pressure, and thermal energy changes in the fluid and heating liquid in the main flow are balanced by those in the auxiliary flow. These are all capable of being accurately checked in a number of ways quite obvious to one skilled in the art. Moreover, the heat, or other energy loss or gain in the main and auxiliary conduits and heating coils can be balanced or can be proved to be negligible. Hence, the apparatus is self-proving and capable of high precision.

The modified form of apparatus shown diagrammatically in Fig. 2 is similar in most respects to that shown in Fig. 1. It differs, however, by using a part of the main mass of fluid to heat said main mass, instead of using another fluid.

As shown herein, the modified form comprises a main conduit 30 through which the main mass of fluid to be measured flows in the direction of the arrows. Connected to the main conduit 30 is an auxiliary conduit 31 withdrawing a part of the main mass at 32 and returning it to the main conduit at 33. To produce the flow through the auxiliary conduit 31, a pressure difference in the main conduit 30 between the points 32 and 33 is established as by an adjustable dam 48 in the main conduit, which offers a resistance to the flow therein. The flow through the auxiliary conduit 31 may be measured by a meter 34, preferably of the positive displacement type, and is controlled by a valve 35.

To effect a thermal change in the main mass of fluid, the auxiliary mass flowing through the conduit 31 is heated by a heat exchanger 36. The latter preferably is positioned to heat the auxiliary mass just before it returns to the main mass with which it is mixed to raise the temperature of the main mass.

Correspondingly, the auxiliary mass is heated in a similar manner and to a similar extent before it is used as a heating medium for the main mass. To this end, a by-pass 37 is connected at one end to the auxiliary conduit 31 beyond the meter 34, as at 38, and at the other end to the auxiliary conduit 31, as at 39, ahead of the heat exchanger 36. An adjustable dam 29 is placed in auxiliary conduit 31 beyond connection 38 and ahead of thermometer 45 to cause the fluid to flow through by-pass 37. Included in the by-pass 37 is a meter 40 of the same type as the meter 34 and mechanically connected thereto as by a link 41 so that the ratio between the fluid passed by the meter 34 and that passed by the meter 40 remains constant and is known. The by-pass then extends through the heat exchanger 36 wherein the fluid is heated to the same temperature to which the fluid in the auxiliary conduit 31 is later heated.

Thermometers 42 and 43 are placed in the main conduit 30 ahead of and beyond the point 33, where the auxiliary mass returns to the main mass, to measure the temperatures of the main mass before and after being heated by the auxiliary mass. A thermometer 44 is also placed in the auxiliary conduit 31 adjacent the return point 33 to measure the temperature to which the auxiliary mass is heated by the heat exchanger 36. Correspondingly, thermometers 45 and 46 are placed in the auxiliary conduit 31 ahead of and beyond the point 39 where the heated by-passed fluid returns to the auxiliary conduit, and a thermometer 47 is placed in the by-pass 37 adjacent the return point 39 to measure the temperature to which the by-passed fluid is heated by the heat exchanger 36.

In the method of measuring the flow by means of this form of the apparatus, the heat added to the main mass is equal to the heat lost by the auxiliary mass when the two masses are mixed. This may be expressed by the following equation:

$$(5) \quad M_{42}(T_{43}-T_{42})SH_{42-43} = M_{34}(T_{44}-T_{43})SH_{44-43}$$

where $M_{42}$ = the main mass, passing thermometer 42 per unit time.

$M_{34}$ = the auxiliary mass as indicated by the meter 34, per unit time.

$T_{42}$, $T_{43}$ and $T_{44}$ are temperatures shown by the thermometers 42, 43 and 44, $SH_{42-43}$ = the mean specific heat of the main mass between the temperatures indicated by the thermometers 42 and 43, and $SH_{44-43}$ = the mean specific heat of the auxiliary mass between the temperatures indicated by the thermometers 44 and 43.

Also, the heat added to the auxiliary mass is equal to the heat lost by the mass passing through the by-pass 37. The following equation expresses this relation:

$$(6) \quad M_{45}(T_{46}-T_{45})SH_{45-46} = M_{40}(T_{47}-T_{46})SH_{47-46}$$

where $M_{45}$ is the mass passing thermometer 45 per unit time and $M_{40}$ is the mass as indicated by the meter 40, per unit time.

$T_{45}$, $T_{46}$ and $T_{47}$ are the temperatures indicated by the correspondingly numbered thermometers, and $SH_{45-46}$ and $SH_{47-46}$ the mean specific heats over the corresponding temperature ranges.

Dividing Equation (5) by Equation (6), the following result is obtained:

$$(7) \quad \frac{M_{42}(T_{43}-T_{42})SH_{42-43}}{M_{45}(T_{46}-T_{45})SH_{45-46}} = \frac{M_{34}(T_{44}-T_{43})SH_{44-43}}{M_{40}(T_{47}-T_{46})SH_{47-46}}$$

But, $T_{42}$ equals $T_{45}$, since the fluid in the auxiliary conduit 31 is withdrawn from that in the main conduit 30, and neither has been changed in temperature.

Also, $T_{44}$ equals $T_{47}$, since the fluids in the by-pass 37 and in the auxiliary conduit 31 have both been heated, at the points where these temperatures are taken, to the same temperature by the heat exchanger 36.

By operating the valve 35 to regulate the flow through the auxiliary conduit 31, $T_{43}$ may be made to equal $T_{46}$. Because of these equalities in the various temperatures, and since the fluids in the main conduit 30, the auxiliary conduit 31 and the by-pass 37 are the same, $SH_{42-43}$ equals $SH_{45-46}$, and $SH_{44-43}$ equals $SH_{47-46}$.

Substituting the various equalities in Equation (7) and simplifying, it becomes $$(8) \quad \frac{M_{42}}{M_{45}} = \frac{M_{34}}{M_{40}}$$

But $$M_{45} = M_{34} - M_{40}$$

and $$M_{42} = M_{43} - M_{34}$$

where $M_{45}$ and $M_{43}$ are in each case the mass of fluid flowing past the thermometers 45 and 43 respectively, per unit time.

Substituting the above values of $M_{45}$ and $M_{42}$ in Equation (8) and simplifying it becomes:

$$(9) \quad M_{43} = \frac{M_{34}^2}{M_{40}}$$

But, as mentioned above, the meters 34 and 40 are mechanically connected so that the ratio of the flow through the respective meters remains constant and is known:

Hence, we may write $$\frac{M_{34}}{M_{40}} = K = \text{the above-mentioned ratio.}$$

Substituting this relation in Equation (9), we have, $$M_{43} = KM_{34}$$

or $$M_{43} = K^2 M_{40}$$

Thus, the total flow through the main conduit 30 passing thermometer 43 may be readily determined from the readings of either meter 34 or meter 40.

In this modified form of the apparatus, the accuracy of the determination depends similarly upon the accuracies of the meters 34 and 40, the various thermometers and the design being such that potential, velocity, pressure, and thermal energy changes in the fluid are balanced in the various parts so that the premises on which the equations are based are realized. These accuracies may be readily determined, and the heat or other energy loss or gain in the main or auxiliary conduits can be balanced, or may be proved to be negligible, so that the apparatus is self-proving and capable of high precision.

In the preferred embodiment (see Fig. 3) of the form of the invention shown diagrammatically in Fig. 1, the main conduit 10 is provided with flange couplings 50 at its respective ends so that it may be placed in a line such as a gas main. The gas flows through the main conduit in the direction indicated by the arrows. At the inlet end, a heat exchanger 51 is placed in the stream of gas. Beyond the heat exchanger 51, is a means for mixing the gas so that it will have a uniform temperature. In the present instance, the mixing means comprises a plurality of perforated conical members 52 constructed to impart a spiral and highly turbulent motion to the gas. As shown in Fig. 4, each member 52 is provided with a plurality of apertures 58 some of which are provided with lips 59 to direct the gas circumferentially, while other of the apertures do not have such lips and hence direct the gas substantially radially across the circumferential flow. Thus, a spiral and highly turbulent motion is imparted to the gas.

The wall of the main conduit 10 is insulated as at 53 and the coils 54 connected with the heat exchanger 51 are embedded therein. The fluid circulating through exchanger 51 and coils 54 serves to reduce to any desired degree any transfer of heat to or from the gas during its flow from exchanger 51 to the heating coils 17 and 18.

The auxiliary conduit 12 is preferably positioned centrally of the main conduit 10 with its inlet end 11 facing the stream of gas. The heating coils 17 and 18 are mounted in concentric relation respectively about and within the inlet end of the auxiliary conduit 12 at the same longitudinal point.

Beyond the heating coil 17, a plurality of perforated conical members 55, similar to the conical members 52, are placed to thoroughly mix the gas after passing over the coils 17 so that the gas will have a uniform temperature which is measured by the thermometer 21. A heat exchanger 56 may be placed at the exit end of the main conduit 10 and connected with coils 57 embedded in the insulation 53 and a fluid is circulated to reduce to any desired degree any transfer of heat to or from the gas during its travel from heating coil 17 to thermometer 21.

Adjacent the outlet end of the main conduit, the auxiliary conduit 12 is bent at a right angle and extended through the wall of the main conduit to the meter 23 and valve 24 and return connection 13 which are not shown in Fig. 3. Neither is the adjustable dam 28 shown in Fig. 3.

The pump 14, heat exchanger 15, and proportioning device 16 are placed outside of the main conduit and are not shown in Fig. 3. Nor is the by-pass 25 shown in Fig. 3, but it is preferably placed inside of the main conduit.

From the above description, it will be apparent that I have provided an apparatus for measuring the flow of a fluid, capable of attaining a high degree of precision. The various parts of the apparatus are capable of measuring the quantities or properties of the fluid for which they are designed with great accuracy and may readily be checked. Thus, the various positive-displacement meters measure the volumes of fluid with great accuracy, the thermometers may be accurate, and, in the case of the form shown in Fig. 1, the proportioning device is accurate. The quantities measured by these devices are the only quantities necessary for the determination of the flow to be measured. The same fluids are used for similar purposes in the main and auxiliary circuits and undergo the same temperature changes, so that all other properties of the fluids such as specific heat and energy loss do not affect the final determination, since these other properties are the same or proportional in the respective circuits.

I claim as my invention:

1. Apparatus for measuring the flow of a main mass of fluid comprising, in combination, means for withdrawing a part of said main mass, means for effecting a heat change in said main mass and said part in a predetermined ratio, means for controlling the flow of said part to equalize the temperature change of said main mass and said part, and means for measuring the flow of said part.

2. Apparatus for measuring the flow of a main mass of fluid comprising, in combination, means for withdrawing a part of said main mass, means for supplying a quantity of heat to said main mass, means for supplying a quantity of heat to said part, means for regulating the ratio between said quantities to a determinable value, means for controlling the flow of said part to equalize the temperature change of said main mass and said part, and means for measuring the flow of said part.

3. Apparatus for measuring the flow of a main mass of fluid comprising, in combination, means for withdrawing a part of said main mass, a source of heat, fluid means for transferring said heat to said main mass and said part in a predetermined ratio, means for controlling the flow of said part to equalize the temperature change of said main mass and said part, and means for measuring the flow of said part.

4. Apparatus for measuring the flow of a main mass of fluid comprising, in combination, means for temporarily withdrawing a part of said main mass, means for changing the temperatures of said main mass and said part equally, means for determining the proportion of quantities of heat to effect said temperature changes, and means for measuring the flow of said part.

5. Apparatus for measuring the flow of a main mass of fluid comprising, in combination, a conduit for said main mass, an auxiliary conduit connected to said conduit for withdrawing a part of said main mass, means for supplying heat to the main mass and to said part to raise the temperatures thereof equally, means for regulating and determining the ratio between the heat supplied to the main mass and said part, and means for measuring the flow in said auxiliary circuit.

6. Apparatus for measuring the flow of a main mass of fluid comprising, in combination, a conduit for said main mass, means connected to said conduit for withdrawing a part of said main mass, means for adding heat to said main mass and said part, a device for controlling and determining the proportion of heat added to said main mass and said part, a device for controlling the flow of said part, one of said devices being adjustable to equalize the temperature change in said main mass and said part, and means for measuring the flow of said part.

7. Apparatus for measuring the flow of a fluid comprising, in combination, a main circuit, an auxiliary circuit for withdrawing a part of the fluid from the main circuit, a divided circuit for a fluid having divisions extending respectively to said main circuit and to said auxiliary circuit to supply heat thereto, means for heating the fluid in the divided circuit, means for proportioning to a determinable value the flow in the divisions of said divided circuit, a valve in said auxiliary circuit to regulate the flow therethrough to equalize the temperature rise in the fluid in the main and auxiliary circuits, and a meter for measuring the flow through said auxiliary circuit.

8. Apparatus for measuring the flow of a fluid comprising, in combination, a main circuit, an auxiliary circuit for withdrawing a part of the fluid from the main circuit, means for supplying heat to the fluid in the main circuit and to said part comprising a divided circuit having a pair of coils mounted respectively in the main circuit and the auxiliary circuit, means for passing a heated fluid through said coils, and means for proportioning the amount of said heated fluid in the respective coils, a valve in said auxiliary circuit to regulate the flow therethrough to equalize auxiliary circuits, and a meter for measuring the flow through said auxiliary circuit.

9. Apparatus for measuring the flow of a fluid comprising, in combination, a main circuit, an auxiliary circuit for withdrawing a part of the fluid from the main circuit, means for supplying heat to the fluid in the main circuit and to said part comprising a pair of coils mounted respectively in the main circuit and the auxiliary circuit and means for supplying a heated fluid to said coils in a predetermined proportion, a valve for regulating the flow in said auxiliary circuit to equalize the temperature change in the fluid in said main circuit and in said part, and a meter for measuring the flow through said auxiliary circuit.

10. Apparatus for measuring the flow of a fluid comprising, in combination, a main circuit, an auxiliary circuit for withdrawing a part of the fluid from the main circuit, means for supplying heat to the fluid in the main circuit and to said part comprising a pair of coils respectively mounted in the main circuit and in the auxiliary circuit, means for supplying a heated fluid to said coils, and means for proportioning in a predetermined ratio the flow of said heated fluid between the respective coils, each of said coils being constructed to transfer sufficient heat from the heated fluid to substantially equalize the temperature thereof and of the surrounding fluid, means for controlling the flow in the auxiliary circuit to equalize the temperature change therein and in the main circuit, and means for measuring the flow in said auxiliary circuit.

11. Apparatus for measuring the flow of a fluid comprising, in combination, a main circuit, an auxiliary circuit for withdrawing a part of the fluid from the main circuit, a circuit for supplying heat to the fluid in the main circuit and in said auxiliary circuit comprising means for supplying a heated fluid, a pair of coils connected with said means to receive the heated fluid therefrom and to return the fluid thereto, said coils being mounted respectively in said main circuit and said auxiliary circuit, means for proportioning the flow between said coils in a predetermined ratio, and a valve-controlled by-pass across the coil in the main circuit to control the temperature of the fluid returning to said means whereby temperatures of the fluid returning from the respective coils may be equalized, and a meter for measuring the flow of said part.

12. Apparatus for measuring the flow of a fluid comprising, in combination, a main circuit, an auxiliary circuit for withdrawing a part of the fluid from the main circuit and returning said part to the main circuit, said auxiliary circuit including a meter for measuring the flow in said auxiliary circuit and means for heating the fluid in said auxiliary circuit before returning to the main circuit, and a by-pass connected to said auxiliary circuit to withdraw fluid therefrom after it has passed through said meter and to return it thereto ahead of said heating means, said by-pass including a meter for measuring the flow therethrough and passing through said heating means whereby the fluid in said by-pass will be heated to the same temperature as the fluid in said auxiliary circuit, said meters being mechanically connected to pass proportional quantities of fluid, and a valve for controlling the flow of fluid through said auxiliary circuit to equalize the temperature change in the fluid in the auxiliary and main circuits.

13. Apparatus for measuring the flow of fluid comprising, in combination, a main circuit, an auxiliary circuit for a part of the fluid from the main circuit leading from and returning to the main circuit, a meter for measuring the flow in said auxiliary circuit, means for heating the fluid in said auxiliary circuit before returning to the main circuit to heat the fluid in the main circuit, means for by-passing a part of the fluid in said auxiliary circuit in a predetermined ratio thereto, means for heating the last-mentioned part before returning it to the auxiliary circuit to heat the fluid in the auxiliary circuit, and a valve for controlling the flow through the auxiliary circuit to equalize the temperature change therein effected by said by-passed fluid and the temperature change in the main circuit.

MATTHEW E. BENESH.

CERTIFICATE OF CORRECTION.

Patent No. 2,015,249.　　　　　　　　　　　　　　　　　　September 24, 1935.

MATTHEW E. BENESH.

It is hereby certified that error appears in the printed specification of the above numbered patent requiring correction as follows: Page 5, second column, line 6, claim 8, after "equalize" insert the words the temperature rise in the fluid in the main and; and that the said Letters Patent should be read with this correction therein that the same may conform to the record of the case in the Patent Office.

Signed and sealed this 5th day of November, A. D. 1935.

Leslie Frazer (Seal)　　　　　　　　　　　　　　　　　　　　　　　Acting Commissioner of Patents.